US005959392A

United States Patent [19]

Beeteson

[11] Patent Number: 5,959,392

[45] Date of Patent: Sep. 28, 1999

[54] CANCELLATION COIL ARRANGEMENT FOR REDUCING STRAY MAGNETIC FIELD EMISSIONS FROM CRT DISPLAYS

[75] Inventor: John Beeteson, Skelmorlie, United Kingdom

[73] Assignee: International Business Machines Corporation, Armonk, N.Y.

[21] Appl. No.: 08/849,495

[22] PCT Filed: Aug. 15, 1995

[86] PCT No.: PCT/GB95/01928

§ 371 Date: Jun. 5, 1997

§ 102(e) Date: Jun. 5, 1997

[87] PCT Pub. No.: WO96/23315

PCT Pub. Date: Aug. 1, 1996

[30] Foreign Application Priority Data

| | | | |
|---|---|---|---|
| Jan. 24, 1995 | [GB] | United Kingdom | 9501278 |
| Feb. 3, 1995 | [GB] | United Kingdom | 9502110 |

[51] Int. Cl.$^{6}$ .......... H04N 9/29

[52] U.S. Cl. .......... 313/313; 335/211

[58] Field of Search .......... 313/313; 335/210–215

[56] References Cited

U.S. PATENT DOCUMENTS

| | | | |
|---|---|---|---|
| 4,864,192 | 9/1989 | Buchwald et al. | 313/8 |
| 5,563,476 | 10/1996 | Smith et al. | 313/370 |

FOREIGN PATENT DOCUMENTS

| | | | |
|---|---|---|---|
| 0348205 A2 | 6/1989 | European Pat. Off. | 313/313 |
| 0348205 | 12/1989 | European Pat. Off. . | |
| 2217959 | 3/1989 | United Kingdom | 313/313 |
| 2217959 | 11/1989 | United Kingdom . | |

*Primary Examiner*—Vip Patel
*Assistant Examiner*—Matthew J. Gerike
*Attorney, Agent, or Firm*—Scully, Scott, Murphy & Presser; Daniel P. Morris, Esq.

[57] ABSTRACT

A cathode ray tube display comprises a cathode ray tube (10) having a screen (11) connected to a neck portion (12) via a bell portion (13). Cancellation coil means (160,160') are arranged to receive a signal based on a scanning signal for the cathode ray tube and arranged to reduce stray magnetic fields radiating from the display. The cancellation coil means comprises a first cancellation coil (160) and a second cancellation coil (160') located on each of opposite sides of the cathode ray tube. The first cancellation coil (160) are located adjacent the bell portion and the second cancellation coil (160') being located adjacent the neck portion. The first and second cancellation coils each being contained in a plane substantially perpendicular to the screen of the cathode ray tube.

9 Claims, 3 Drawing Sheets

CANCELLATION COIL ARRANGEMENT FOR REDUCING STRAY MAGNETIC FIELD EMISSIONS FROM CRT DISPLAYS

BACKGROUND OF THE INVENTION

1. Technical Field

The present invention relates to a cathode ray tube (CRT) display apparatus with reduced stray magnetic fields.

2. Prior Art

The picture on a CRT display device, such as computer visual display unit or a television receiver, is typically produced by scanning an electron across the CRT screen in a raster pattern. The picture is then sequentially generated by amplitude modulating the electron beam with an input video signal as the electron beam is scanned across the screen.

The raster scan is produced by deflecting the electron beam with time-varying magnetic fields produced within the CRT. The magnetic fields are produced in the CRT by energising line and frame scan coils mounted in a yoke around the neck of the CRT with line and frame scan currents each having a sawtooth waveform. The time-varying magnetic fields also extend beyond the confines of the CRT and the yoke and may radiate from the display device as stray magnetic fields. The stray fields can produce an unwanted deflection in neighbouring display devices. The unwanted deflections can produce undesirable visual disturbances in pictures displayed on the neighbouring devices. The stray field from the frame scan coil tends to produce more objectionable disturbances than that from the line scan coil. If the unwanted deflection is exactly the same frequency and phase as the normal deflection, then there is no visible interference. However, this is usually not the case. The following two arrangements are more typical. In the first arrangement, adjacent CRT displays are displaying pictures based on video signals in the same video format, but from different system units. Thus, the line and frame scan frequencies received by the displays are slightly different and are not phase-locked. The resulting visual disturbance is a dark (or light depending on the display orientation) bar slowly rolling up or down the screen. The bar is the result of the fast field change of the vertical retrace of the interfering display. In the second arrangement, adjacent displays receive video signals in different video formats, so that the related scan frequencies are different. Vertical retrace interference occurs in the same way as mentioned above in connection with the first arrangement, but this time at random phases so that the interference is seen as an undesirable flicker effect.

The above mentioned problems caused by placing CRT displays next to each have been solved by enclosing at least the electron guns and the yokes of the CRTs in high magnetic permeability, ferro-magnetic shields. Examples of such solutions are described in U.S. Pat. No. 4,864,192 and EP-A-0 348 205. The shields prevent stray fields generated in adjacent display devices from entering the CRT. Conventionally, the shields are formed from Mumetal (trade mark of Telcon Metals Limited, Crawley, Sussex, England). However, Mumetal shields are relatively expensive, thereby mitigating against volume manufacture.

Another conventional solution is to mount cancellation coils on the yoke of the CRT in a CRT display device. The cancellation coils are connected in series with the frame scan coils. In operation, the sawtooth scan current flowing in the frame scan coils also flows in the cancellation coils. The cancellation coils are oriented to generate, as a function of the sawtooth current flow, a magnetic cancellation field in anti-phase with the stray field from the yoke. The cancellation field destructively interferes with the stray field to reduce the net magnetic field strength of the stray field. Thus, the interference effect on any adjacent display is reduced. Such coils do not prevent external field sources from affecting the display device to which they are fitted. Therefore, to be effective, all displays in an installation should be fitted with cancellation coils. The problem with this arrangement is that the cancellation coils complicate the construction of the yoke assembly resulting in a more expensive end product. Furthermore, the space occupied by the coils may limit freedom in the mechanical design of the display or in the placement of components on the display drive circuit boards.

GB 2 217 959 A describes a lower cost solution in which a pair of cancellation coils connected in series with the frame scan coils of a CRT display device. The cancellation coils are placed either at the sides of the CRT or above and below it. The dimensions of the cancellation coils are commensurate with those of the CRT. Once again, the scan current flowing through the frame scan coils also flows through the cancellation coils to generate a cancellation magnetic field in anti-phase to the stray field from the frame scan coils. The cancellation field destructively interferes with the stray field to reduce the net magnetic field strength of the stray field, thereby reducing the effect of the stray field on adjacent displays. This solution, however, does not provide a sufficient reduction in the stray fields to prevent visual interference when two or more displays are packed tightly into the same installation.

SUMMARY OF THE INVENTION

In accordance with the present invention, there is now provided a cathode ray tube display comprising: a cathode ray tube having a screen connected to a neck portion via a bell portion; and cancellation coil means arranged to receive a signal based on a scanning signal for the cathode ray tube and arranged to reduce stray magnetic fields radiating from the display; the cancellation coil means comprises a first cancellation coil and a second cancellation coil located on each of opposite sides of the cathode ray tube, the first cancellation coil being located adjacent the bell portion, the second cancellation coil being located adjacent the neck portion, and tile first and second cancellation coils each being contained in a plane substantially perpendicular to the screen of the cathode ray tube; characterised in that on each said opposite side of the cathode ray tube, the first and second cancellation coils are contained in the same plane.

Because, in accordance with the present invention, individual cancellation coils are effectively distributed along the sides of the display, a more uniform reduction of the stray magnetic field from the frame deflection coils can be achieved compared with conventional techniques. Specifically, the cancellation coils are distributed so that the cancellation fields each generates in operation is targeted at a separate portion of the stray magnetic field generated by frame coils. Furthermore, because the cancellation coils are distributed effectively along the sides of the display with each coil on a given side targeting a different portion of the stray magnetic field radiating on that side, each coil can be implemented with fewer turns than was necessary in previous solutions in which only two cancellation coils were provided in the display. The relatively low number of turns means the coils in displays of the present invention are thin enough to pose negligible mechanical constraints on the construction of the display.

Preferably, the first cancellation coils have a greater number of turns than the second cancellation coils. In general however, the number of turns and the size of each cancellation coil may be varied from coil to another to adjust the strength of the cancelation fields produced by the cancellation coils in accordance with the relative strength of the portion of the stray field at which that cancellation coil is targeted.

A particularly preferred embodiment of the present invention comprises a jacket enclosing the bell portion and the neck portion of the cathode ray tube, the jacket having fixings positioned on opposite sides thereof, the first and second cancellation coils being mounted on the fixings.

The first and second cancellation coils are preferably connected in series with a frame scan coil of the cathode ray tube.

A preferred example of the present invention comprises a shield enclosing the bell portion of the cathode ray tube, the shield being formed from a material with a high magnetic permeability. The shield may optionally extend to enclose the neck portion of the cathode ray tube.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
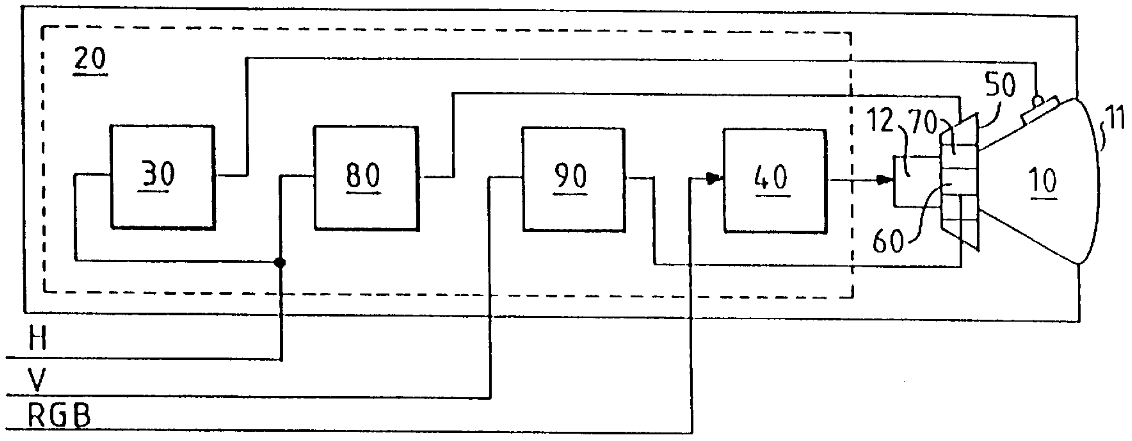
FIG. 1 is a block diagram of an example of a CRT display.

Referring first a FIG. 1, an example of a CRT display of the present invention comprises a colour cathode ray display tube (CRT) 10. CRT 10 comprises an evacuated envelope formed by a screen 11 tapering to a closed neck section 12 via a bell section 13. CRT 10 is connected to display drive circuitry 20. Display drive circuitry 20 comprises an Extra high Tension (EHT) generator 30 and a video amplifier 40 connected to display screen 10. Line and frame scan coils 50 and 60 are disposed around the neck of the CRT on a yoke 70. Scan coils 50 and 60 are connected to line and frame scan circuits 80 and 90 respectively. Line scan circuit 80 and EHT generator 30 may each be in the form of a flyback circuit, the operation of which is well known by those skilled in the art. Furthermore, as is also well-known in the art, EHT generator 30 and line scan circuit 80 may be integrated in a single flyback circuit. A power supply (not shown) is connected via power supply rails (not shown) to EHT generator 30, video amplifier 40, and line and frame scan circuits 80 and 90. In use, the power supply provides electrical power on the supply rails from Line and Neutral connections (not shown) to the domestic electricity mains supply. The power supply may be in the form of a switch mode power supply, the operation of which is well-understood by those skilled in the art.

In operation, EHT generator 30 generates an electric field within CRT 10 for accelerating electrons in beams corresponding to the primary colours of red, green and blue towards the screen of CRT. Line and frame scan circuits 80 and 90 generate line and frame scan currents in scan coils 50 and 60. The line and frame scan currents are in the form of ramp signals to produce time-varying magnetic deflection fields that scan the electron beams across the screen of CRT 10 in a raster pattern. The line and frame scan signals are synchronised by line and frame scan circuits to input line and frame synchronisation (sync) signals H and V generated by a video source such as a personal computer system unit, for example. Video amplifier 40 modulates the red, green and blue electron beams to produce an output display on CRT 10 as a function of corresponding red, green and blue input video signals shown collectively as RGB also generated by the video source. The time varying magnetic fields produced by the yoke also extend beyond the confines of CRT 10. Without effective counter-measures, these magnetic fields may radiate from the display as stray magnetic fields of significant strength. As mentioned earlier, the stray fields can produce an unwanted deflection in neighbouring displays. Typically, yoke assembly 70 comprises a ferrite ring surrounding neck 12. The stray field enters CRT 10 of the neighbouring display through bell section 13 and neck 12, on either side of the yoke ferrite. The unwanted deflections can produce undesirable visual disturbances in pictures displayed on the neighbouring display. The stray field from frame scan coil 60 tends to produce more objectionable disturbances than that from line scan coil 50. The stray field from frame scan coil 60 makes a significant contribution to the total Extremely Low Frequency Magnetic Field emission or ELMF emission from the display.

Figures 2A, 2B:
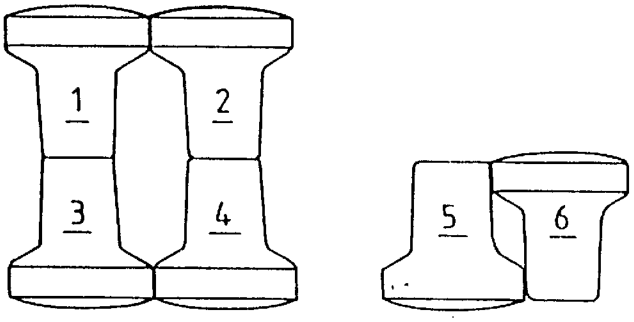
FIGS. 2A and 2B are plan views of displays arranged in close proximity.
Figure 3:
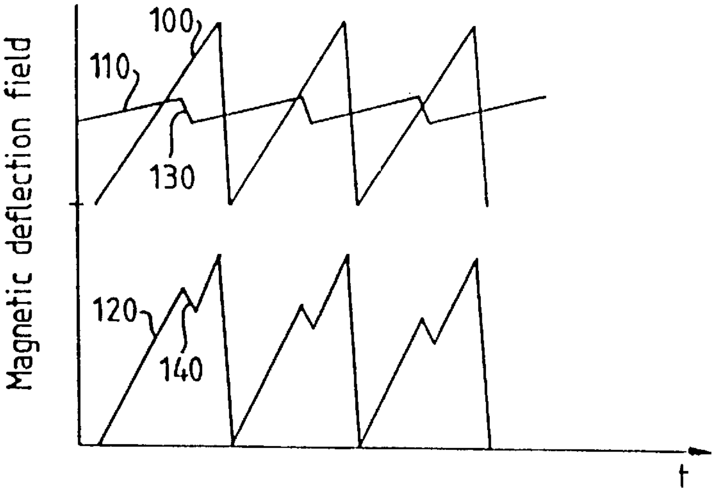
FIG. 3 is a plan view of a stray magnetic field radiating from one display to another.

FIG. 2A shows a typical office arrangement of four displays, 1 to 4. The arrangement in such that the stray magnetic fields radiating from the yoke of display 1 may interfere with deflection fields produced in the CRT of display 2 and visa versa. Similarly, the stray magnetic fields radiating from display 3 may interfere with deflection fields produced in the CRT of display 4 and visa versa. FIG. 3 shows the magnetic field from display 2 radiating into the CRT of display 1 through bell section 13 and neck section 12. There may equally be interference, albeit to a lesser extent, between the stray fields radiating from display 3 and the deflection fields produced in display 1 and visa versa, and between the stray fields radiating from display 2 and the deflection fields produced in display 4 and visa versa, although the visual effects of these interferences. FIG. 2B shows another typical office arrangement in which a pair of displays, 5 and 6, are even more tightly packed together, leading to greater interference by stray magnetic fields.

Figure 4:
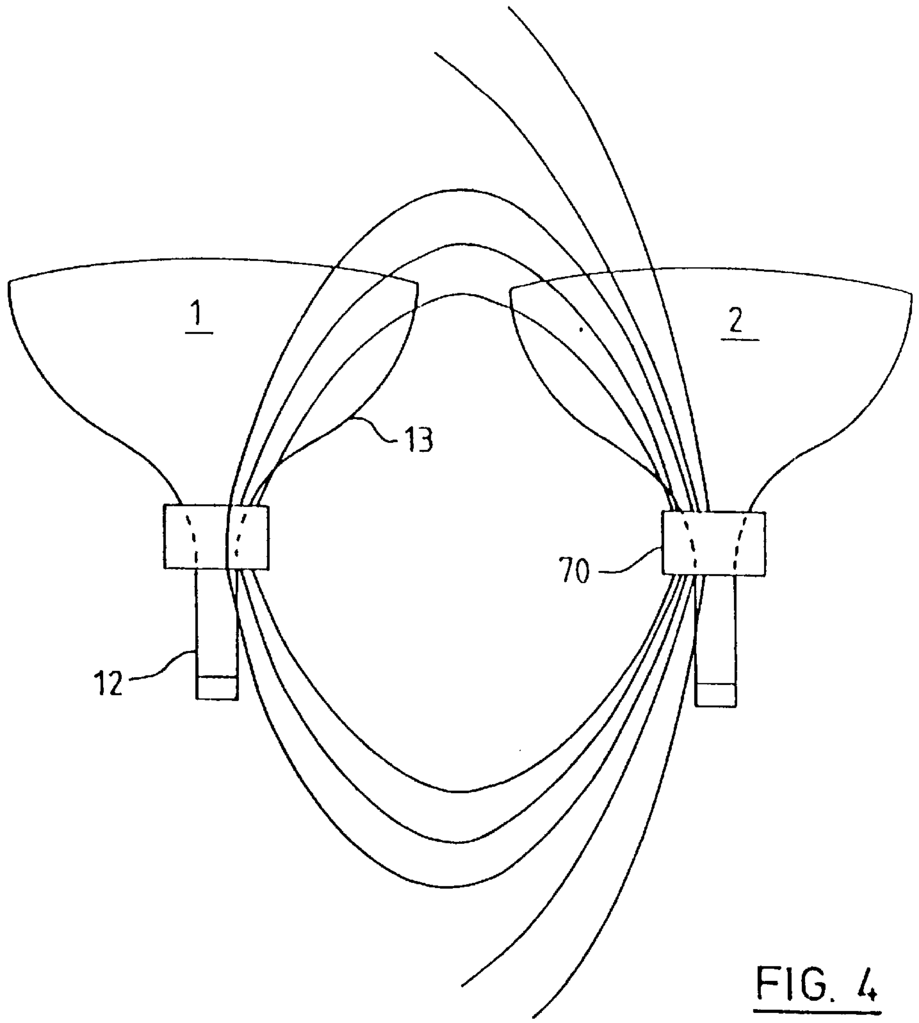
FIG. 4 shows waveform diagram showing deflection fields in adjacent displays.

Referring now to FIG. 4, assume that adjacent displays 1 and 2 in FIG. 2A are displaying pictures based on video signals in the same video format, but from different system units. The line and frame scan frequencies received by the displays are thus slightly different and are not phase-locked. Waveform 100 is indicative of the time varying deflection field from frame scan coil 60 in display 5 of FIG. 21B. Waveform 110 is indicative of the stray field radiating into CRT 10 of display 2 from frame scan coil 60 of adjacent display 1. The two fields interfere additively in CRT 10 to produce a composite field indicated by waveform 120. Each frame retrace 140 in stray field waveform 100 produces a notch 130 in defection field waveform 120. Notch 130 moves progressively down the frame trace period of waveform 120 from one cycle to the next. Notch 130 appears as a dark (or light depending on the display orientation) bar slowly rolling up or down the screen of display 1.

Figure 5:
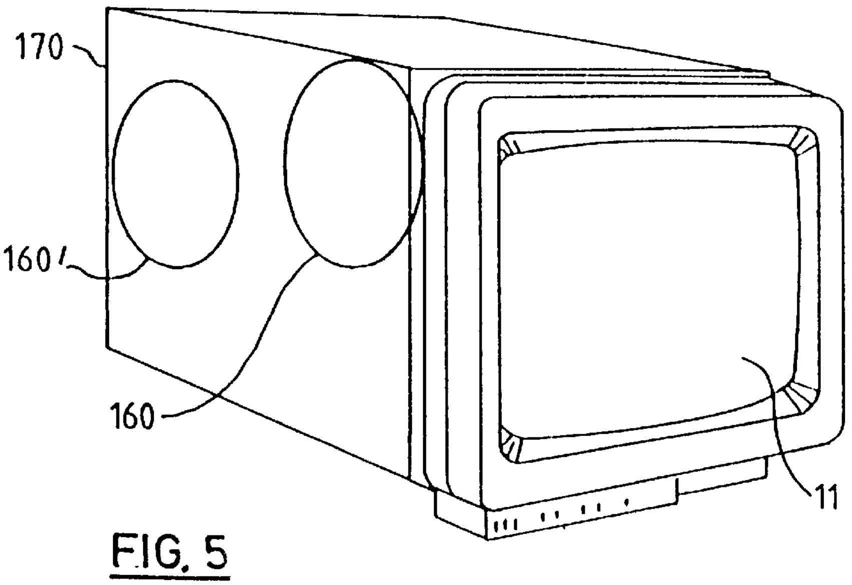
FIG. 5 is a perspective view of an example of a CRT display of the present invention.
Figure 6:
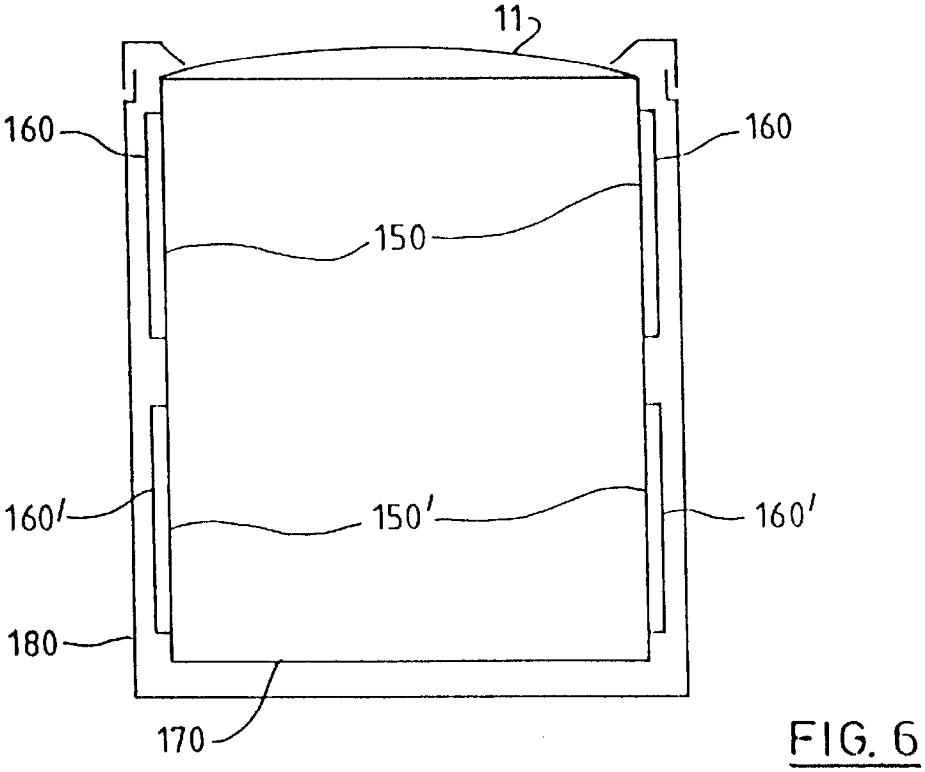
FIG. 6 is a plan view of the example of the display of the present invention.

Referring now to FIG. 5 and 6 in combination, in accordance with the present invention, the CRT display of FIG. 1 is fitted with a plurality of pairs 50 of cancellation coils 60. Cancellation coils 160 are connected in series with frame scan coils 60. In operation, the frame scan current thus flows through both frame scan coils 60 and cancellation coils 160. Cancellation coils 160 are each oriented to produce a magnetic cancellation field in anti-phase to the stray magnetic field from frame scan coils 60. Cancellation coils 160 in each pair 150 are each disposed on opposite facing sides of the display. Pairs 150 are distributed along the sides of the display. By distributing cancellation coils 160 along the side, more uniform reduction of the stray magnetic field from the frame deflection coils can be achieved. Specifically, cancellation coils 160 are distributed so that the cancellation fields each generates in operation is targeted at a separate portion of the stray magnetic field generated by frame coils 60. The number of turns in each pair of coils and the size of each coil may be varied from one pair to another to adjust the strength of the cancelation fields produced by the pair in accordance with the relative strength of the portion of the stray field at which the pair is targeted.

Figure 7:
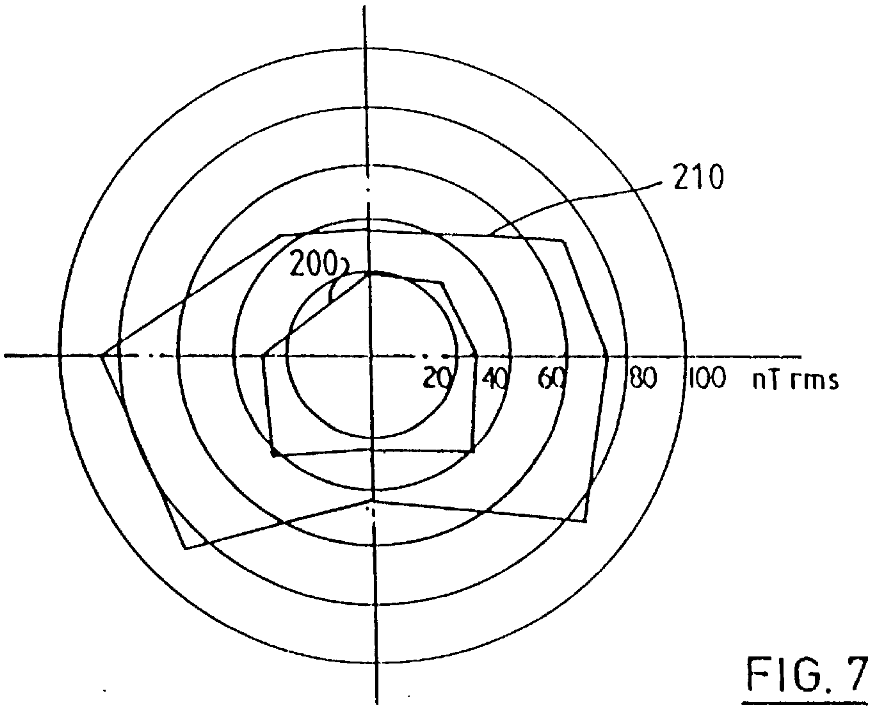
FIG. 7 is a graph showing the distribution of a stray magnetic field radiating from frame scan coils of a display both when no cancellation coils are fitted and when cancellation coils are fitted.

A preferred embodiment of the present invention comprises two pairs, 150 and 150', of cancellation coils straddling the display. Tle cancellation coils are attached to fixings (not shown) on the exterior of a conductive inner jacket 170 containing drive circuit 20 and CRT 10 of the display. Jacket 170 is preferably formed from metal. The cancellation coils are then enclosed by the exterior cover 180 of the display. The fixings on jacket 170 advantageously permit retro-fitting of the cancellation coils to the display. Coils 160 in pair 150 are located adjacent the bell section 13 of CRT 10 in an elevated position relative to the centre axis of CRT 10. Coils 160' in pair 150' are located on the centre axis of CRT 10 adjacent neck 12 of CRT 10. In operation, the coils 160 in pair 150 generate cancellation fields for cancelling the portion of the stray magnetic field from frame scan coils 60 radiating from the bell section of CRT 10. From FIG. 4, it will be appreciated that this portion of the stray field would otherwise radiate into the bell section of a CRT in any adjacent display. The coils 160' in pair 150 generate cancellation fields for cancelling the portion of the stray magnetic field from frame scan coils 60 radiating from neck portion 12 of CRT 10. From FIG. 4, it will be appreciated that this portion of the field would otherwise radiate into the neck portion of a CRT of any adjacent display. The coils 160 in pair 150 have a greater number of turns than the coils 160' in pair 150' so that the cancellation fields generated by pair 150 are greater in strength than the cancellation fields generated by pair 150'. This is because the strength of the portion of the stray magnetic field from frame coils 60 radiating from bell section 13 tends to be greater than the strength of the portion of the stray magnetic field radiating from neck section. Furthermore, coils 160 in pair 150 are larger in diameter than coils 160' in pair 150'. This improves the spread of the cancellation fields from coils 160. In a particularly preferred embodiment of the present invention, coils 160 have 9 turns each and coils 160' have 6 turns each. The inductance of coils 160 and 160' is typically of the order of 40 uH each with a resistance of 0.5 ohm. It will be appreciated that, in other embodiments of the present invention, there may be more than two pairs of coils each targeted at a different portion of the stray magnetic field. FIG. 7 shows the reduction in stray magnetic field radiation from frame scan coils provided by cancellation 160 and 160'. Specifically, plot 200 illustrates the stray magnetic field distribution around the display with no cancellation coils fitted, and plot 210 illustrates the distribution with cancellation coils 160 and 160'.

Because, in accordance with the present invention, cancellation coils are distributed effectively along the sides of the display with each coil on a given side targeting a different portion of the stray magnetic field radiating on that side, each coil can be implemented with fewer turns than was necessary in previous solutions in which only two cancellation coils were provided in the display. The relatively low number of turns means the coils in displays of the present invention are thin enough to pose negligible mechanical constraints.

In the embodiments of the present invention hereinbefore described, distributed cancellation coils are provided in a CRT display to reduce to the stray magnetic fields from the frame scan coils of the display extending beyond the confines of the display into an adjacent display. In a modification of these preferred embodiments, CRT 10 is at least partially enclosed by shield from a high permeability material. The shield reduce the effect on the picture generated on screen 11 of CRT 10 of stray magnetic fields radiating from any adjacent CRT displays. Significant reduction is achieved if only bell section 13 of CRT 10 is shielded. however, in particularly preferred embodiments of the present invention, CRT 10 is completely or near-completely enclosed by the shield to provide optimum protection. The shield may be formed from mumetal. Mumetal has an initial relative permeability of typically 15000 at frame frequencies. However, annealing Mumetal fabrications, for example for four in a Hydrogen environment, can increase the permeability to around 60,000. One problem with forming the shield from Mumetal is that Mumetal is relatively expensive. In especially preferred embodiments of the present invention therefore the shield is formed from a less expensive, high purity, low carbon iron, such as Remko. Remko has an initial relative permeability of typically 2000. However, the permeability of Remko fabrications can be increased by decarburizing annealing, for four hours for example, to 15,000. The degree of magnetic shielding provided by Remko is therefore less than that provided by Mumetal. However, as mentioned earlier, Remko is less expensive than Mumetal.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A cathode ray tube display comprising: a cathode ray tube (10) having a screen (11) connected to a neck portion (12) via a bell portion (13); and cancellation coil means (160,160') arranged to receive a signal based on a scanning signal for the cathode ray tube and arranged to reduce stray magnetic fields radiating from the display; the cancellation coil means comprises a first cancellation coil (160) and a secoftd cancellation coil (160') located on each of opposite sides of the cathode ray tube, the first cancellation coil (160) being located adjacent the bell portion, the second cancellation coil (160') being located adjacent the neck portion, and the first and second cancellation coils each being contained in a plane substantially perpendicular to the screen of the cathode ray tube; characterised in that on each said opposite side of the cathode ray tubie, the first and second cancellation coils are contained in the same plane.

2. A display as claimed in claim 1 wherein the first cancellation coils have a greater number of turns than the second cancellation coils.

3. A display as claimed in claim 1, comprising a jacket enclosing the bell portion and the neck portion of the cathode ray, tube, the jacket having fixings positioned on opposite sides thereof, the first and second cancellation coils being mounted on the fixings.

4. A display as claimed in claim 1, whierein the first and second cancellation coils are connected in series with a frame scan coil of the cathode ray tube.

5. A display as claimed in claim 1, comprising a shield enclosing the bell portion of the cathode ray tube, the shield being formed from a material with a high magnetic permeability.

6. A display as claimed in claim 5, wherein the shield extends to enclose the neck portion of the cathode ray tube.

7. A display as claimed in claim 6, wherein the shield is formed from Mumetal.

8. display as claimed in claim 6, wherein the shield is formed from a high purity, low carbon iron.

9. A display is claimed in claim 8, wherein the shield is formed from Remko.

* * * * *

UNITED STATES PATENT AND TRADEMARK OFFICE
CERTIFICATE OF CORRECTION

PATENT NO. : 5,959,392 Page 1 of 2

DATED : September 28, 1999

INVENTOR(S) : John Beeteson

It is certified that error appears in the above-identified patent and that said Letters Patent is hereby corrected as shown below:

In the Drawings, Sheet 1 of 3, FIG. 1:

"

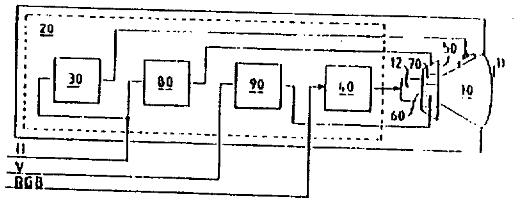

"

FIG. 1 should read --

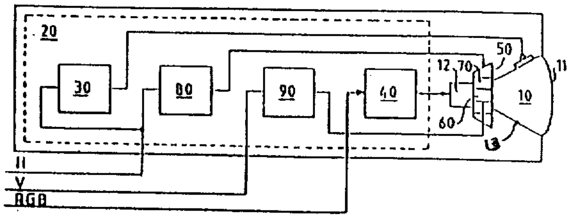

--

FIG. 1

UNITED STATES PATENT AND TRADEMARK OFFICE

CERTIFICATE OF CORRECTION

PATENT NO. : 5,959,392 Page 2 of 2

DATED : September 28, 1999

INVENTOR(S) : John Beeteson

It is certified that error appears in the above-identified patent and that said Letters Patent is hereby corrected as shown below:

Column 2, line 43: "tile" should read --the--

Column 5, line 7: "pairs 50 of cancellation coils 60" should read --pairs 150 of cancellation coils 160--

Column 6, line 61, Claim 1: "secoftd" should read --second--

Signed and Sealed this

Fifteenth Day of August, 2000

*Attest:*

Q. TODD DICKINSON

*Attesting Officer*

*Director of Patents and Trademarks*